United States Patent
Launiainen

(10) Patent No.: US 6,721,867 B2
(45) Date of Patent: Apr. 13, 2004

(54) MEMORY PROCESSING IN A MICROPROCESSOR

(75) Inventor: Aki Launiainen, Tampere (FI)

(73) Assignee: Nokia Mobile Phones, Ltd., Espoo (FI)

( * ) Notice: Subject to any disclaimer, the term of this patent is extended or adjusted under 35 U.S.C. 154(b) by 180 days.

(21) Appl. No.: 10/126,155

(22) Filed: Apr. 19, 2002

(65) Prior Publication Data

US 2002/0166037 A1 Nov. 7, 2002

(30) Foreign Application Priority Data

May 3, 2001 (FI) .............................. 20010924

(51) Int. Cl.[7] .............................................. G06F 12/00
(52) U.S. Cl. ................... 711/201; 711/109; 711/154; 711/219
(58) Field of Search ................. 711/201, 219, 711/109, 154; 712/204

(56) References Cited

U.S. PATENT DOCUMENTS

| | | | |
|---|---|---|---|
| 3,916,388 A | 10/1975 | Shimp et al. | 340/172.5 |
| 5,014,187 A * | 5/1991 | Debize et al. | 710/66 |
| 5,170,477 A * | 12/1992 | Potter et al. | 711/201 |
| 5,404,560 A * | 4/1995 | Lee et al. | 712/208 |
| 5,499,380 A | 3/1996 | Iwata et al. | 395/800 |
| 5,568,412 A * | 10/1996 | Han et al. | 708/497 |
| 6,061,779 A | 5/2000 | Garde | 712/204 |
| 6,512,716 B2 * | 1/2003 | Oberlaender et al. | 365/230.02 |

OTHER PUBLICATIONS

Panda et al., "Data and Memory Optimization Techniques for Embedded Systems," pp 149–206, ACM, Apr. 2001.*
Edwards, White Paper, "Performance Evaluation of the TMS320C64x Architecture and C Compiler," pp 1–21, Blue Wave Systems, Inc., Oct. 25, 2000.*

* cited by examiner

*Primary Examiner*—Matthew Kim
*Assistant Examiner*—Stephen Elmore
(74) *Attorney, Agent, or Firm*—Perman & Green, LLP

(57) ABSTRACT

The invention relates to memory processing in a microprocessor. The microprocessor comprises a memory indicated by means of alignment boundaries for storing data, at least one register for storing data used during calculation, memory addressing means for indicating the memory by means of the alignment boundaries and for transferring data between the memory and the register, and a hardware shift register, which can be shifted with the accuracy of one bit, and which comprises a data loading zone and a guard zone. The memory addressing means transfer data including a memory addressing which cannot be fitted into the alignment boundary between the memory and the register through the data loading zone in the hardware shift register, and the hardware shift register is arranged to process data using shifts and utilizing the guard zone.

22 Claims, 3 Drawing Sheets

Figures 1, 2A, 2B, 2C, 2D:
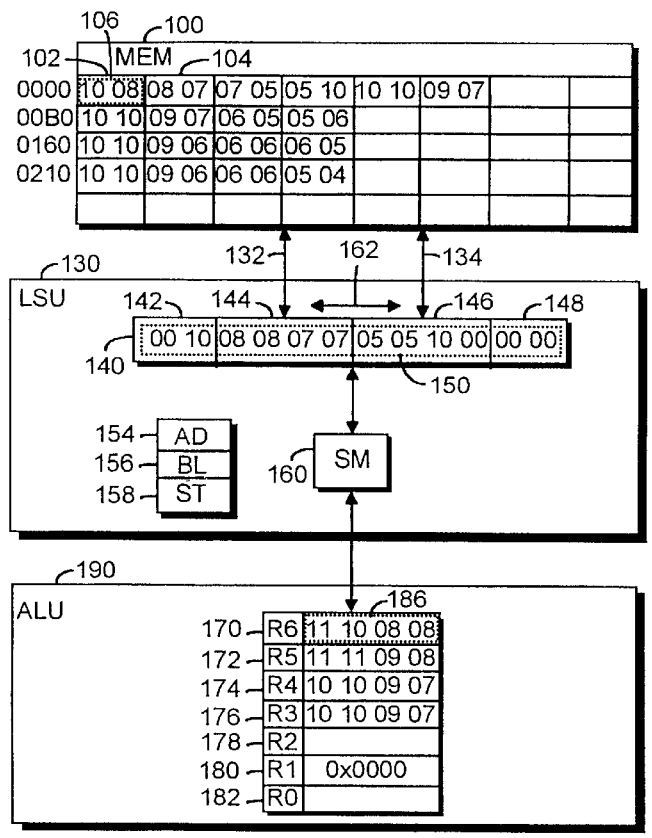

```
GP: 5 CYCLES
LD ADDRESS,R0    ;"10 08 08 07"
SHL R0,8,R0      ;"08 08 07 00"
LD ADDRESS+1,R1  ;"07 05 05 10"
SHR R1,24,R1     ;"00 00 00 07"
OR R0,R1,R0      ;"08 08 07 07"
```

```
TMS320C55X: 3 CYCLES
AC0=SMEM<<24           ;"08 00 00 00"
AC0=AC0+(SMEM+1<<8)    ;"08 08 07 00"
AC0=AC0+(SMEM+1<<-8)   ;"08 08 07 07"
```

```
TMS320C64X: 1 CYCLE
LDNW++ADDRESS(1),A0;"08 08 07 07"
```

```
HW SHIFTER: 1 CYCLE
LM R0,++ADDRESS(8),32;"08 08 07 07"
```

|     |                   | R1     | R2       | 144,146          | 156 |          |
| --- | ----------------- | ------ | -------- | ---------------- | --- | -------- |
| 300 | CMODE 1           |        |          | 0000000000000000 | 00  | buf-mode |
| 302 | MV R0, 32         |        |          |                  |     |          |
| 304 | LM R2, *R1+, R0   | 0x0004 | 10080807 | 1008080700000000 | 00  | mem-load |
| 306 | PSAD R11, R6, R2  |        | 10080807 |                  |     |          |
| 308 | MODE 3            |        |          | 1008080700000000 | 00  | vec-mode |
| 310 | MV R0, 8          |        |          |                  |     |          |
| 312 | LM R2, *R1+, R0   | 0x0008 | 08080707 | 0808070705051000 | 24  | mem-load |
| 314 | PSAD R10, R6, R2  |        | 08080707 |                  |     |          |
| 316 | LM R2, *R1+, R0   | 0x0008 | 08070705 | 0807070505100000 | 16  | buf-load |
| 318 | PSAD R9, R6, R2   |        | 08070705 |                  |     |          |
| 320 | LM R2, *R1+, R0   | 0x0008 | 07070505 | 0707050510000000 | 08  | buf-load |
| 322 | PSAD R8, R6, R2   |        | 07070505 |                  |     |          |
| 324 | LM R2, *R1+, R0   | 0x0008 | 07050510 | 0705051000000000 | 00  | buf-load |
| 326 | PSAD R7, R6, R2   |        | 07050510 |                  |     |          |
| 328 | ADD R1, R1, 0xA8  | 0x00B0 |          |                  |     |          |
| 330 | CMODE 1           |        |          | 0000000000000000 | 00  | buf-mode |
| 332 | MV R0, 32         |        |          |                  |     |          |
| 334 | LM R2, *R1+, R0   | 0x00B4 | 10100907 | 1010090700000000 | 00  | mem-load |
| 336 | PSAD R16, R5, R2  |        | 10100907 |                  |     |          |
| 338 | MODE 3            |        |          | 1010090700000000 | 00  | vec-mode |
| 340 | MV R0, 8          |        |          |                  |     |          |
| 342 | LM R2, *R1+, R0   | 0x00B8 | 10090706 | 1009070605050600 | 24  | mem-load |
| 344 | PSAD R15, R5, R2  |        | 10090706 |                  |     |          |
| 346 | LM R2, *R1+, R0   | 0x00B8 | 09070605 | 0907060505060000 | 16  | buf-load |
| 348 | PSAD R14, R5, R2  |        | 09070605 |                  |     |          |
| 350 | LM R2, *R1+, R0   | 0x00B8 | 07060505 | 0706050506000000 | 08  | buf-load |
| 352 | PSAD R13, R5, R2  |        | 07060505 |                  |     |          |
| 354 | LM R2, *R1+, R0   | 0x00B8 | 06050506 | 0605050600000000 | 00  | buf-load |
| 356 | PSAD R12, R5, R2  |        | 06050506 |                  |     |          |
| 358 | ADD R16, R16, R11 |        |          |                  |     |          |
| 360 | ADD R15, R15, R10 |        |          |                  |     |          |
| 362 | ADD R14, R14, R9  |        |          |                  |     |          |
| 364 | ADD R13, R13, R8  |        |          |                  |     |          |
| 366 | ADD R12, R12, R7  |        |          |                  |     |          |
| 368 | ADD R1, R1, 0xA8  | 0x0160 |          |                  |     |          |
| 370 | CMODE 1           |        |          | 0000000000000000 | 00  | buf-mode |

Fig 3

|  |  | R1 | R2 | 144,146 | 156 |  |
|---|---|---|---|---|---|---|
| 400 | CMODE 1 |  |  | 0000000000000000 | 00 | buf-mode |
| 402 | MV R0, 11 |  |  |  |  | max vlc length |
| 404 | LM R2, *R1+, R0 | 0x0004 | 00000080 | 0000008040403800 | 21 | mem-load |
| 406 | LD R4, *R3(R2) |  |  |  |  | load value and length |
| 408 | AND R5, R4, 0x00ff |  |  |  |  | mask length (4) |
| 410 | ST *R6+, R4 |  |  |  |  | store decoded value |
| 412 | LMC R2, *R1+, R5 | 0x0004 | 00000001 | 0000000000808070 | 28 | clear buffer |
| 414 | LM R2, *R1+, R0 | 0x0004 | 00000004 | 0000000404038000 | 17 | buf-load |
| 416 | LD R4, *R3(R2) |  |  |  |  | load value and length |
| 418 | AND R5, R4, 0x00ff |  |  |  |  | mask length (11) |
| 420 | ST *R6+, R4 |  |  |  |  | store decoded value |
| 422 | LMC R2, *R1+, R5 | 0x0004 | 00000004 | 0000000004038000 | 17 | clear buffer |
| 424 | LM R2, *R1+, R0 | 0x0004 | 00000020 | 000000201C000000 | 06 | buf-load |
| 426 | LD R4, *R3(R2) |  |  |  |  | load value and length |
| 428 | AND R5, R4, 0x00ff |  |  |  |  | mask length (9) |
| 430 | ST *R6+, R4 |  |  |  |  | store decoded value |
| 432 | LMC R2, *R1+, R5 | 0x0004 | 00000008 | 0000000007000000 | 08 | clear buffer |
| 434 | LM R2, *R1+, R0 | 0x0008 | 00000038 | 0000003838484880 | 29 | mem-load |
| 436 | LD R4, *R3(R2) |  |  |  |  | load value and length |
| 438 | AND R5, R4, 0x00ff |  |  |  |  | mask length (2) |
| 440 | ST *R6+, R4 |  |  |  |  | store decoded value |
| 442 | LMC R2, *R1+, R5 | 0x0008 | 00000000 | 000000001C1C2424 | 38 | clear buffer |
| 444 |  |  |  |  |  | 6 guard-bits used |
| 446 | LM R2, *R1+, R0 | 0x0008 | 00000000 | 000000E0E1212200 | 27 | buf-load |

Fig 4

|  |  | R1 | R2 | 144,146 | 156 |  |
|---|---|---|---|---|---|---|
| 500 | CMODE 1 |  |  | 0000000000000000 | 00 | buf-mode |
| 502 | MV R0, 32 |  |  |  |  |  |
| 504 | LM R2, *R1+, R0 | 0x0004 | 10080807 | 1008080700000000 | 00 | mem-load |
| 506 | MODE | 3 |  | 1008080700000000 | 00 | vec-mode |
| 508 | MV R0, 8 |  |  |  |  |  |
| 510 | LM R2, *R1+, R0 | 0x0008 | 8080707 | 0808070705051000 | 24 | mem-load |
| 512 | LM R2, *R1+, R0 | 0x0008 | 8070705 | 0807070505100000 | 16 | buf-load |
| 514 | LM R2, *R1+, R0 | 0x0008 | 7070505 | 0707050510000000 | 08 | buf-load |
| 516 | LM R2, *R1+, R0 | 0x0008 | 7050510 | 0705051000000000 | 00 | buf-load |
| 518 | LM R2, *R1+, R0 | 0x000C | 5051010 | 0505101010080700 | 24 | mem-load |
| 520 | SUB R1, R1, 0x0C | 0x0000 |  |  |  |  |
| 522 | LM R2, *R1+, R0 | 0x0000 | 5101010 | 0510101008070000 | 16 | buf-load |
| 524 | LM R2, *R1+, R0 | 0x0000 | 10101008 | 1010100807000000 | 08 | buf-load |
| 526 | LM R2, *R1+, R0 | 0x0000 | 10100807 | 1010080700000000 | 00 | buf-load |
| 528 | LM R2, *R1+, R0 | 0x0004 | 10080710 | 1008071008080700 | 24 | mem-load |
| 530 | LM R2, *R1+, R0 | 0x0004 | 8071008 | 0807100808070000 | 16 | buf-load |
| 532 | LM R2, *R1+, R0 | 0x0004 | 7100808 | 0710080807000000 | 08 | buf-load |
| 534 | LM R2, *R1+, R0 | 0x0004 | 10080807 | 1008080700000000 | 00 | buf-load |

Fig 5

MEMORY PROCESSING IN A MICROPROCESSOR

FIELD

The invention relates to memory processing in a microprocessor.

BACKGROUND

A microprocessor comprises an external and/or internal memory indicated by means of alignment boundaries for storing data. An arithmetic-logic unit (ALU) carrying out calculations in the microprocessor employs registers to temporarily store the data to be processed in the calculations. Data is transferred according to need between the memory and the register. Alignment problems are associated with memory processing. An alignment problem means that it is more difficult to process a memory addressing, which cannot be fitted within the alignment boundaries, in the memory addressing sense than such data that accurately starts from one alignment boundary and ends at another alignment boundary. Processing the data that cannot be fitted into the alignment boundaries can be referred to as unaligned data access. Current microprocessors generally employ either byte addresses (8 bits) or word addresses (16 bits) for addressing the memory, but larger alignment boundaries also exist, such as 32 bits. An alignment boundary determines from which part of the memory data can be read and how data is stored in the memory.

U.S. Pat. No. 6,061,779 discloses a solution in which a separate data alignment buffer is used for unaligned data access. The solution is not very flexible as it employs a multiplexer, to which alternatives for reading data from various parts in the memory are fixedly determined.

In FIGS. 2A, 2B and 2C commands in a microprocessor instruction set are used to describe prior art methods for processing memory in a microprocessor. The contents of the registers in each cycle are described using comments, which are separated from the actual commands with a semicolon. The contents of the memory employed are described below in more detail in a memory 100 shown in FIG. 1, the 64-bit contents at the beginning thereof is indicated as a hexadecimal figure "10 08 08 07 07 05 05 10". Section "08 08 07 07" is to be retrieved from the memory.

In FIG. 2A a general purpose processor that is capable of addressing memory by 32-bit alignment boundaries, carries out a memory search using five processor cycles in such a manner that 32 bits are at first loaded from a memory address ADDRESS indicating the beginning of the 64-bit contents to register R0. Then register R0 is shifted eight bits to the left. After this 32 bits are loaded from a memory address ADDRESS+1, or from the middle of the 64-bit contents, to register R1. Next, register R1 is shifted 24 bits to the right. Finally a logical OR operation is carried out between registers R0 and R1, and the result thereof is placed into register R0. The solution thus requires the use of two registers, two memory searches, two register shifts and one logical OR operation.

In FIG. 2B the Texas Instruments® TMS320C55x processor is employed that addresses the memory in 16-bit mode. The memory search can generally be carried out using three cycles in such a manner that a 40-bit accumulator AC0 is at first loaded with the first 16 bits from the 64-bit contents and the contents of the accumulator are shifted 24 bits to the left. Then the following 16 bits from the 64-bit contents are loaded into the accumulator and shifted 8 bits to the left. Finally the accumulator is loaded with the following 16 bits from the 64-bit contents, which are shifted 8 bits to the right. The solution thus requires three memory searches and three shifts.

In FIG. 2C the Texas Instruments®TMS320C64x processor that is able to address memory in 8-bit mode can be used to carry out the memory search in a single cycle. Using a particular command LDNW (Load Non-Aligned Word) the second, third, fourth and fifth byte of the 64-bit contents are read into register A0. The solution is efficient as regards the use of cycles but it requires an 8-bit memory addressing. The search of unaligned data still remains a problem if said data cannot be fitted into the 8-bit alignment boundary.

BRIEF DESCRIPTION

It is an object of the invention to provide an improved microprocessor. According to an aspect of the present invention there is provided a microprocessor comprising a memory indicated by means of alignment boundaries for storing data, at least one register for storing data used during calculation, memory addressing means for indicating the memory by means of the alignment boundaries and for transferring data between the memory and the register, and a hardware shift register, which can be shifted with the accuracy of one bit, and which comprises a data loading zone and a guard zone, and the memory addressing means transfer data including a memory addressing which cannot be fitted into the alignment boundary between the memory and the register through the data loading zone in the hardware shift register, and the hardware shift register is arranged to process data using shifts and utilizing the guard zone.

The invention is based on the idea that a hardware shift register, which can be shifted with the accuracy of one bit, can be used to solve the problem associated with the search of unaligned data. A hardware shift register comprises both a data loading zone and a guard zone. The solution is adaptable and allows to efficiently process memory.

LIST OF DRAWINGS

In the following the preferred embodiments of the invention are described by way of example with reference to the accompanying drawings, in which:

FIG. 1 is a simplified block diagram illustrating the structure of a microprocessor as regards the description of the embodiments, FIGS. 2A, 2B and 2C show prior art ways to process memory in a microprocessor by means of the commands in an instruction set of a microprocessor, FIG. 2D illustrates a new way to process memory in a microprocessor, FIG. 3 illustrates how the sum of absolute differences is calculated as regards the memory processing in a microprocessor, FIG. 4 illustrates how the variable length codes are decoded as regards the memory processing in a microprocessor, FIG. 5 illustrates how to process a circular buffer as regards the memory processing in a microprocessor.

DESCRIPTION OF EMBODIMENTS

With reference to FIG. 1 an example showing the structure of a microprocessor is described. It is apparent for those skilled in the art that microprocessors include many other structural parts and functions than the ones illustrated, but regarding the embodiments described herein the omitted parts are not essential.

The microprocessor comprises a memory 100. Here the term memory 100 refers both to the internal memory of a microprocessor and to the external memory connected to the microprocessor through a bus, both implemented by means of known techniques. The difference between the registers 170 to 182 to be presented below and the memory 100 is mainly that data used during calculation is stored in the registers 170 to 182 for a short time, for example for a few seconds at the most, whereas data is generally stored in a memory for a longer time, even for as long as several years. Another difference between the memory 100 and the register 170 to 182 is that data generally disappears from the registers 170 to 182 when a microprocessor is switched off, but the data in the memory 100 is generally preserved also when the microprocessor is switched off. In general it is more time-consuming to process the memory 100 than the register 170 to 182. As regards the microprocessor the memory 100 can be addressed according to alignment boundaries 102, 104.

The microprocessor also comprises calculation means 190 for performing calculations using data located in the registers 170, 172, 174, 176, 178, 180, 182. The calculations means 190 are generally referred to as an arithmetic logic unit (ALU) but the calculation means 190 also refer to other ways known in microprocessor technology to implement a functional unit performing calculations.

The microprocessor thus comprises at least one register 170 to 182 for storing data 186 used during calculation. Frequently the registers 170 to 182 are considered to be a part of an arithmetic logic unit, but they may also be located elsewhere in the microprocessor, as long as the calculation means 190 are able to process the registers 170 to 182, i.e. to read the registers 170 to 182 and to write into the registers 170 to 182. In this example the registers 170 to 182 are located in an arithmetic logic unit.

In order to implement the microprocessor's memory management the microprocessor comprises memory addressing means 130 for addressing the memory 100 by means of alignment boundaries and for transferring data between the memory 100 and the register 170 to 182. The memory addressing means 130 are also known for example as the Load and Store Unit, LSU, but the memory addressing means 130 also refer to other ways known in microprocessor technology for implementing a functional unit carrying out memory management to the microprocessor. The load and store unit LSU generally includes a Sign-extension and Mask Unit 160 that allows to carry out measures associated with processing the sign of the number and to process the number using a mask.

In this example the alignment boundary 102, 104 of the memory 100 is 16 bits, but deviating sizes are understandably also possible. The most common sizes are multiples of 8 bits, such as 8, 16 or 32 bits. The structure of the memory 100 can be shown as a matrix. For simplicity, the memory 100 in FIG. 1 comprises a 8×5 matrix that includes 40×16 bits, but it is apparent for those skilled in the art that the size of the actual memories is very much larger, for example several giga bytes. The contents of the memory 100 are indicated in hexadecimal numbers, meaning for instance that data 106 included in the alignment boundary 102 is indicated as 10 08 in hexadecimal numbers, 00010000 00001000 in binary numbers and 4104 in decimal numbers.

There are 7 registers in this example: registers R0, R1, R2, R3, R4, R5 and R6. The size of each register 170 to 182 is 32 bits and the contents of the registers 170 to 182 are indicated in hexadecimal numbers. For example, the data 182 included in the register 170 is indicated in hexadecimal numbers as 11 10 08 08, in binary numbers as 00010001 00010000 00001000 00001000 and in decimal numbers as 286263304. It is apparent for those skilled in the art that the number of registers is larger in reality and the size of the registers may vary, for example as multiples of 8 bits.

The microprocessor further comprises a hardware shift register 140 that can be shifted with the accuracy of one bit and which comprises a data loading zone 144, 146 and a guard zone 142, 148. In this example the data loading zone and guard zone are located so that the hardware shift register 140 comprises a first guard zone 142, a first loading zone 144 of the size of a register 170, a second loading zone 146 of the size of a register 170, and a second guard zone 148. It is apparent for those skilled in the art that the structure of the hardware shift register 140 can be modified in order to achieve the desired technical effect. For example the size of the loading zone 144, 146 can be adjusted and the number of guard zones 142, 148 may in some cases be only one. In this example the size of the loading zones 144, 146 is 32 bits, as the size of the registers 170 is also 32 bits. A person skilled in the art may adjust the size of the guard zones 142, 148 to correspond with a desired size. The size of the guard zone 142, 148 is generally selected to be a multiple of 8 bits, such as 8, 16 or 32 bits. In this example, 16 bits is selected as the size of the 142, 148. Here, the size of the hardware shift register 140 is therefore 16+32+32+16=96 bits, but those skilled in the art may define another size for said register, as long as the data to be processed can be fitted thereto and some space remains to perform the shifts.

The memory addressing means 130 transfer data including a memory addressing that cannot be fitted into the alignment boundary between the memory and the register 170 to 182 through the loading zone 144, 146 of the hardware shift register 140, and the hardware shift register 140 is arranged to process data using shifts 162 and utilizing guard zones 142, 148.

FIG. 2D shows an example of a processor, to which the hardware shift register 140 is added, and which is able to address memory by means of alignment boundaries, in which case the memory search can be carried out in one cycle. A particular command Lm (Load Memory) is used to read 32 bits from the memory 100 to register R0. The 32 bits to be read are the same as the ones explained above in the examples shown in FIGS. 2A, 2B and 2C, i.e. from number "10 08 08 07 07 05 05 10" section "08 08 07 07". The address ADDRESS refers to the beginning of the number, or to the beginning of the alignment boundary 102, and term ++ADDRESS(8) indicates the offset to the initial address, i.e. the hardware shift register 140 shifts the contents thereof 8 bits to the left.

The memory addressing means 130 thus transfer the first 32 bits "10 08 08 07" from the memory 100 to the first loading zone 144 of the hardware shift register 140 along a bus 132 and the remaining 32 bits "07 05 05 10" to the second loading zone 146 of the hardware shift register 140 along a bus 134. Then the contents of the hardware shift register 140 are shifted 8 bits to the left in the direction of the arrow 162, whereby 8 bits "10" from the first loading zone 144 are shifted to the first guard zone 142, and the 8 bits "07" on the left are shifted from the second loading zone 146 to the first loading zone 144. The 64-bit number "10 08 08 07 07 05 05 10" loaded into the hardware shift register is thus shifted 8 bits to the left. In FIG. 1 the contents 150 of the hardware shift register 140 describe the situation after this shift. The first loading zone 144 thus includes the desired 32-bit number "10 08 07 07" that is shifted to the R0 register 182.

In the example shown in FIG. 2D data including a memory addressing that cannot be fitted into the alignment boundary is transferred from the memory 100 through the loading area 144, 146 of the hardware shift register 140 to the register 182. An appropriate alignment is achieved so that the hardware shift register 140 is arranged to process data using shifts 162 and utilizing the guard zone 142, 148. The memory 100 can be addressed with the accuracy of one bit irrespective of the, for example, 8-bit or 16-bit alignment boundary. The used command LM is provided with parameters such as a desired location in the memory with the accuracy of the alignment boundary ADDRESS, with an offset X to the beginning of the desired data and with the length of the desired data with the accuracy of one bit. The example in FIG. 2D illustrates only one way of implementing a command, as a person skilled in the art knows how to arrange an instruction set according to the target processor.

In the embodiment illustrated as an example in FIG. 2D the memory addressing means 130 employ two buses 132, 134 for loading data from the memory 100 to both loading areas 144, 146, since the unaligned data continues across the alignment boundary 102. In an embodiment the memory addressing means 130 use only one bus 134 for loading data from the memory 100 to one loading zone 146, if the unaligned data is within one alignment boundary 102. However, in both embodiments the memory addressing means 130 perform shifts in the hardware shift register 140 for aligning the unaligned data.

In an embodiment the memory addressing means 130 process the data in the hardware shift register 140 using a mask 160 for aligning unaligned data before transferring said data to the register 170 to 182. The mask 160 can be used to remove certain parts from the numbers in the loading zone 144, 146, particularly in an embodiment in which the unaligned data is within one alignment boundary 102 only and thus also within the loading zone 146. In addition a possible sign expansion is performed at the same time. After loading, the contents of the hardware shift register 140 can be cleared. The unaligned data can be stored in the memory 100 only if the size thereof fits into the alignment boundary.

The management of the hardware shift register 140 use can be implemented in various ways. In an embodiment the memory addressing means 130 comprise a status register 158 that allows to control the use of the hardware shift register 140. A number placed in the status register determines the purpose for which the hardware shift register 140 is used.

The status register is used for example so that the default value zero of the status register 158 signifies that the hardware shift register 140 is arranged to be used in accordance with the example shown in FIG. 2D for processing the unaligned data in connection with the operations to be carried out between the memory 100 and the register 170 to 182. These operations may be loading functions from the memory 100 or storing functions to the memory 100. The value one of the status register 158 signifies a buffer mode, and the hardware shift register 140 is thus arranged to be used as a buffer in the functions to be carried out between the memory 100 and the register 170 to 182. The status register 158 value three refers to a vector mode, and the memory addressing means 130 then employ the buffer by means of vectors so that the memory addressing means 130 employ two buses 132, 134 for loading data from the memory 100 to the hardware shift register 140 and to carry out the shifts in accordance with the length of the vector. Other values can also be determined for the status register 158 in order to control the use of the hardware shift register 140.

In an embodiment the memory addressing means 130 comprise an address register 154 which includes the address of a location in the memory 100 corresponding to the location last processed in the hardware shift register 140. This provides such an advantage that the memory addressing means 130 maintain information about which location the location in the hardware shift register 140 corresponds to in the memory 100, whereby the number of loadings can be reduced from the memory 100 when employing the hardware shift register for consecutive memory searches as an ordinary buffer or as a buffer including vectors.

In an embodiment the memory addressing means 130 comprise a bit counter register 156 that includes the number of still un-processed bits in the data of the hardware shift register 140. This embodiment allows to process the contents of the hardware shift register 140 particularly as an ordinary buffer or as a buffer including vectors.

When the hardware shift register 140 is used as a buffer the memory addressing means 130 employ one bus 134 for loading data from the memory 100 to the hardware shift register 140. Thus the memory addressing means 130 load the data to one loading zone 146 in the hardware shift register 140, in this example into the second loading zone 146. Then the memory addressing means 130 carry out shifts in the hardware shift register 140 in order to process data. After this, the memory addressing means 130 process the data in the hardware shift register 140 using the mask 160, if needed, before transferring said data to the register 170 to 182. The possible sign extension is also carried out at this point.

During the loading operation it is first checked if the hardware shift register 140 includes an adequate number of bits, or if the number of required bits is smaller than or equals the value of the bit counter register 156. If the number of bits is adequate then no measures are taken, otherwise the memory addressing means 130 transfer the data in the second loading zone 146 to the first loading zone 144, and load data from a location 104 following a location 102 corresponding to the second loading zone 146 in the memory to the second loading zone 146. The value of the bit counter register 156 and the address register 154 are updated at the same time. What is thereafter carried out is a required shift 162 of the hardware shift register 140, a possible processing by means of the mask 160 and a sign extension, a shift from the first loading zone 144 to the register 182, a possible clearing of the first loading zone 144 and an updating of the bit counter register 156 value.

During the storing operation the data in the register 170 is eventually processed using the mask and a sign extension is carried out in the unit 160, i.e. the memory addressing means 130 process the data in the register 170 using the mask 160 for aligning the unaligned data before transferring said data to the hardware shift register 140. The memory addressing means 130 transfer the data from the register 170 to a loading zone 146, in this example to the second loading zone 146. The contents of the hardware shift register 140 are then shifted to the left so that the data is transferred to the first loading zone 144 in the hardware shift register 140. If the data fits entirely into the first loading zone 144 and if the bit counter register 156 reports after updating that additional space is still available in the hardware shift register 140, then the storing into the memory 100 is not yet carried out. When the value of the bit counter register 156 indicates that no more data can be fitted into the loading zones 144, 146 in the hardware shift register 140 from a register without having to shift data to the first guard zone 142, then data is stored into the memory 100. Data is stored into the memory in such a manner that the memory addressing means 130 use one bus 132 for storing data from the hardware shift register 140 to the memory 100, and the address register 154 is updated as well as the bit counter register 156. The memory addressing means 130 thus shift the data in the second loading zone 146 to the first loading zone 144 and store the data in the first loading zone 144 into the memory 100. Finally the first loading zone 144 is generally cleared and the value of the bit counter register 156 is updated.

The use of the hardware shift register 140 as a buffer described herein thus allows the data to be flexibly processed using less memory operations both in loading and storing than what is generally possible. In an embodiment the memory addressing means 130 employ the buffer implemented using the hardware shift register 140 as a circular buffer, meaning that the first end and the last end of the buffer are concatenated to one another.

Next in FIGS. 3, 4 and 5 the use of the hardware shift register 140 as a buffer is illustrated in various applications. The contents of the memory 100 employed are shown in FIG. 1. In FIGS. 3, 4 and 5 the first column shows the reference number of the operation to be carried out, the second column shows the operation and the eventual operands thereof, the third column shows the memory address as the contents of register R1, the fourth column shows data as the contents of register R2, the fifth column shows the contents of the loading zone 144, 146, the sixth column shows the contents of the bit counter register 156 and the seventh column shows the comment.

FIG. 3 illustrates how the Sum of Absolute Differences (SAD) is calculated as regards the memory processing of the microprocessor. An example describes how the SAD is calculated for a 4×4 block in five consecutive co-ordinates (location). The block to be calculated (current) is stored into registers R6, R5, R4 and R3 and the search zone (reference) is in the memory at the memory location indicated by address register R1. The example includes the SAD calculation only for all five locations of the two first lines in the 4×4 block. In step 300, one is set as the value for the status register 158, meaning that the buffer mode is switched on, and the address register 154, the bit counter register 156 and the contents of the hardware shift register 140 are zeroed.

In step 302, value 32 (to perform the shift) is set for register R0.

In step 304, 32 bits are loaded from the address indicated in R1 by the memory and said bits are shifted 32 bits to the left in the hardware shift register 140 and the value is stored into register R2.

In step 306, the SAD is calculated for four packed bytes (for the values included in R6 and R2) and the result is stored into register R11

In step 308, the value of the status register 158 is set at three, meaning that the vector mode is switched on.

In step 310, value 8 (to perform the shift) is set for register R0.

In step 312, 32 bits are loaded from the address indicated by R1 in the memory and the hardware shift register 140 is shifted 8 bits and the value is stored into register R2.

In step 314, the SAD is calculated for four packed bytes (for the values included in R6 and R2) and the result is stored into register R10.

In step 316, the hardware shift register 140 is shifted 8 bits and the value is stored into register R2.

In step 318, the SAD is calculated for four packed bytes (for the values included in R6 and R2) and the result is stored into register R9.

In step 320, the hardware shift register 140 is shifted 8 bits and the value is stored into register R2.

In step 322, the SAD is calculated for four packed bytes (for the values included in R6 and R2) and the result is stored into register R8.

In step 324, the hardware shift register 140 is shifted 8 bits and the value is stored into register R2.

In step 326, the SAD is calculated for four packed bytes (for the values included in R6 and R2) and the result is stored into register R7.

In step 328, address register R1 is updated to point at the following line.

In step 330, one is set as the value for the status register 158, meaning that the buffer mode is switched on and the address register 154 the bit counter register 156 and the contents of the hardware shift register 140 are zeroed.

In step 332, value 32 (to perform the shift) is set for register R0.

In step 334, 32 bits are loaded from the address indicated by R1 in the memory and said bits are shifted 32 bits to the left in the hardware shift register 140 and the value is stored into register R2.

In step 336, the SAD is calculated for four packed bytes (for the values included in R6 and R2) and the result is stored into register R16.

In step 338, one is set as the value for the status register 158, meaning that the vector mode is switched on.

In step 340, value 8 (to perform the shift) is set for register R0.

In step 342, 32 bits are loaded from the address indicated by R1 in the memory and the hardware shift register 140 is shifted 8 bits and the value is stored into register R2.

In step 344, the SAD is calculated for four packed bytes (for the values included in R6 and R2) and the result is stored into register R15.

In step 346, the hardware shift register 140 is shifted 8 bits and the value is stored into register R2.

In step 348, the SAD is calculated for four packed bytes (for the values included in R5 and R2) and the result is stored into register R14.

In step 350, the hardware shift register 140 is shifted 8 bits and the value is stored into register R2.

In step 352, the SAD is calculated for four packed bytes (for the values included in R5 and R2) and the result is stored into register R13.

In step 354, the hardware shift register 140 is shifted 8 bits and the value is stored into register R2.

In step 356, the SAD is calculated for four packed bytes (for the values included in R5 and R2) and the result is stored into register R12.

In step 358, the SAD values of the first location (R16 and R11) are summed together and the result is stored into register R16.

In step 360, the SAD values of the second location (R15 and R10) are summed together and the result is stored into register R15.

In step 362, the SAD values of the third location (R14 and R9) are summed together and the result is stored into register R14.

In step 364, the SAD values of the fourth location (R13 and R8) are summed together and the result is stored into register R13.

In step 366, the SAD values of the fifth location (R12 and R7) are summed together and the result is stored into register R12.

In step 368, address register R1 is updated to point at the following line.

In step 370, one is set as the value for the status register 158, meaning that the buffer mode is switched on, and the address register 154, the bit counter register 156 and the contents of the hardware shift register 140 are zeroed. Then, the processing of the line may continue as described.

FIG. 4 illustrates how Variable Length Codes (VLC) are decoded as regards the memory processing of the microprocessor. In step 400, one is set as the value for the status register 158, meaning that the buffer mode is switched on, and the address register 154, the bit counter register 156 and the contents of the hardware shift register 140 are zeroed.

In step 402, value 11 is set for register R0 (the maximum VLC length).

In step 404, the first 11 bits are read from the memory indicated by address register R1 (32 bits are read into the hardware shift register 140 and shifted 11 bits to the left) and said 11 bits are stored into register R2.

In step 406, the decoded value and the length of the code word are read from the VLC table (R2nd value from the memory indicated by R3) and this piece of information is stored into register R4.

In step 408, the length information is distinguished (from the code/length pair) and stored into register R5.

In step 410, the decoded value is stored into the memory location indicated by R6 to be processed later.

In step 412, the hardware shift register 140 is shifted one length value to the right and the left half 144 of the hardware shift register 140 is cleared.

In step 414, the following 11 bits are read from the hardware shift register 140 and stored into register R2.

In step 416, the decoded value and the length of the code word are read from the VLC table (R2nd value from the memory indicated by R3) and this piece of information is stored into register R4

In step 418, the length information is distinguished (from the code/length pair) and stored into register R5.

In step 420, the decoded value is stored into the memory location indicated by R6 to be processed later.

In step 422, the hardware shift register 140 is shifted one length value to the right and the left half 144 of the hardware shift register 140 is cleared.

In step 424, the following 11 bits are read from the hardware shift register 140 and stored into register R2.

In step 426, the decoded value and the length of the code word are read from the VLC table (R2nd value from the memory indicated by R3) and this piece of information is stored into register R4.

In step 428, the length information is distinguished (from the code/length pair) and stored into register R5.

In step 430, the decoded value is stored into the memory location indicated by R6 to be processed later.

In step 432, the hardware shift register 140 is shifted one length value to the right and the left half 144 of the hardware shift register 140 is cleared.

In step 434, the following 11 bits are read (32 bits are read from the memory indicated by address register R1 to the hardware shift register 140 which is shifted 11 bits to the left) and said 11 bits are stored into register R2.

In step 436, the decoded value and the length of the code word are read from the VLC table (R2nd value from the memory indicated by R3) and this piece of information is stored into register R4

In step 438, the length information is distinguished (from the code/length pair) and stored into register R5.

In step 440, the decoded value is stored into the memory location indicated by R6 to be processed later.

In step 442, the hardware shift register 140 is shifted one length value to the right and the left half 144 of the hardware shift register 140 is cleared. It should be noted here that the right-hand guard zone 148 of the hardware shift register 140 is now used, meaning that the value of the bit counter register is 38, whereof 6 are bits within the guard zone 148.

In step 446, the following 11 bits are read from the hardware shift register 140 and stored into register R2, and the processing thereof may continue as described.

FIG. 5 illustrates how a circular buffer is processed as regards the memory processing of the microprocessor. In this example the software length of the buffer is 3×32 bits. In step 500, one is set as the value of the status register 158, meaning that the buffer mode is switched on, and the address register 154, the bit counter register 156 and the contents of the hardware shift register 140 are zeroed.

In step 502, value 32 (to perform the shift) is set for register R0.

In step 504, 32 bits are loaded from the address indicated by R1 in the memory and said bits are shifted 32 bits to the left in the hardware shift register 140 and the value is stored into register R2.

In step 506, the value of the status register 158 is set at three, meaning that the vector mode is switched on.

In step 508, value 8 (to perform the shift) is set for register R0.

In step 510, the following 32 bits are read (32 bits are read from the memory indicated by address register R1 to the hardware shift register 140 which is shifted 11 bits to the left) and said bits are stored into register R2.

In step 512, the following 32 bits are read (the hardware shift register 140 is shifted 8 bits to the left) and said bits are stored into register R2.

In step 514, the following 32 bits are read (the hardware shift register 140 is shifted 8 bits to the left) and said bits are stored into register R2.

In step 516, the following 32 bits are read (the hardware shift register 140 is shifted 8 bits to the left) and said bits are stored into register R2.

In step 518 the following 32 bits are read (32 bits are read from the memory indicated by address register R1 to the hardware shift register 140 which is shifted 8 bits to the left) and said bits are stored into register R2.

In step 520, address register R1 is updated to point at the beginning of the circular buffer.

In step 522, the following 32 bits are read (the hardware shift register 140 is shifted 8 bits to the left) and said bits are stored into register R2.

In step 524, the following 32 bits are read (the hardware shift register 140 is shifted 8 bits to the left) and said bits are stored into register R2.

In step 526, the following 32 bits are read (the hardware shift register 140 is shifted 8 bits to the left) and said bits are stored into register R2.

In step 528, the following 32 bits are read (32 bits are read from the memory indicated by address register R1 to the hardware shift register 140 which is shifted 8 bits to the left) and said bits are stored into register R2.

In step 530, the following 32 bits are read (the hardware shift register 140 is shifted 8 bits to the left) and said bits are stored into register R2.

In step 532, the following 32 bits are read (the hardware shift register 140 is shifted 8 bits to the left) and said bits are stored into register R2.

In step 534, the following 32 bits are read (the hardware shift register 140 is shifted 8 bits to the left) and said bits are stored into register R2. As can be observed the contents of the hardware shift register 140 are the same as in step 504. The processing of the circular buffer may thus continue as described above.

Even though the invention has been described above with reference to the example of the accompanying drawings, it is obvious that the invention is not restricted thereto but can be modified in various ways within the scope of the inventive idea disclosed in the attached claims.

What is claimed is:

1. A microprocessor comprising
   a memory indicated by means of alignment boundaries for storing data,
   at least one register for storing data used during calculation,
   memory addressing means for indicating the memory by means of the alignment boundaries and for transferring data between the memory and the register, and
   a hardware shift register, which can be shifted with the accuracy of one bit, and which comprises a data loading zone and a guard zone,
   and the memory addressing means transfer data including a memory addressing which cannot be fitted into the alignment boundary between the memory and the register through the data loading zone in the hardware shift register, and the hardware shift register is arranged to process data using shifts and utilizing the guard zone.

2. A microprocessor as claimed in claim 1, wherein the data loading zone and the guard zone comprise a first guard zone, a first loading zone of the size of a register, a second loading zone of the size of a register and a second guard zone.

3. A microprocessor as claimed in claim 1, wherein the hardware shift register is arranged to be used for processing unaligned data in the operations to be carried out between the memory and the register.

4. A microprocessor as claimed in claim 3, wherein the memory addressing means employ one bus for loading data from the memory to the loading zone if the unaligned data is within one alignment boundary.

5. A microprocessor as claimed in claim 4, wherein the memory addressing means employ two buses for loading data from the memory to both loading zones if the unaligned data continues beyond the alignment boundary.

6. A microprocessor as claimed in claim 5, wherein the memory addressing means perform shifts in the hardware shift register in order to align the unaligned data.

7. A microprocessor as claimed in claim 3, wherein the memory addressing means process the data included in the hardware shift register using a mask to align the unaligned data before transferring said data to the register.

8. A microprocessor as claimed in claim 1, wherein the hardware shift register is arranged to be used as a buffer in the operations to be carried out between the register and the memory.

9. A microprocessor as claimed in claim 8, wherein the memory addressing means employ one bus for loading data from the memory to the hardware shift register.

10. A microprocessor as claimed in claim 9, wherein the memory addressing means load the data to one loading zone in the hardware shift register.

11. A microprocessor as claimed in claim 8, wherein the memory addressing means perform shifts in the hardware shift register for processing data.

12. A microprocessor as claimed in claim 8, wherein the memory addressing means process the data included in the hardware shift register using a mask before transferring said data to the register.

13. A microprocessor as claimed in claim 9, wherein the memory addressing means transfer the data in the second loading zone to the first loading zone, and load data from a location following a location corresponding to the second loading zone in the memory to the second loading zone.

14. A microprocessor as claimed in claim 8, wherein the memory addressing means employ one bus for storing data from the hardware shift register to the memory.

15. A microprocessor as claimed in claim 14, wherein the memory addressing means transfer data from the register to one loading zone.

16. A microprocessor as claimed in claim 8, wherein the memory addressing means process the data included in the register using a mask to align the unaligned data before transferring said data to the hardware shift register.

17. A microprocessor as claimed in claim 15, wherein the memory addressing means transfer the data in the second loading zone to the first loading zone and store the data included in the first loading zone into the memory.

18. A microprocessor as claimed in claim 8, wherein the memory addressing means use a buffer by means of vectors in such a manner that the memory addressing means employ two buses for loading data from the memory to the hardware shift register and to perform the shifts according to the vector lengths.

19. A microprocessor as claimed in claim 8, wherein the memory addressing means use the buffer as a circular buffer, meaning that the first end and the last end of the buffer are concatenated to one another.

20. A microprocessor as claimed in claim 1, wherein the memory addressing means comprise a status register for controlling the use of the hardware shift register.

21. A microprocessor as claimed in claim 1, wherein the memory addressing means comprise an address register which includes the address of a location in the memory corresponding to the location last processed in the hardware shift register.

22. A microprocessor as claimed in claim 1, wherein the memory addressing means comprise a bit counter register which includes the number of still unprocessed bits of the data included in the hardware shift register.

* * * * *